United States Patent
Graham et al.

(10) Patent No.: US 11,897,200 B2
(45) Date of Patent: Feb. 13, 2024

(54) RAPID WASH SYSTEM FOR ADDITIVE MANUFACTURING

(71) Applicant: Carbon, Inc., Redwood City, CA (US)

(72) Inventors: Ian Alastair Graham, Millbrae, CA (US); Kyle Laaker, Redwood City, CA (US); Florian Markus Barth, Los Gatos, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/857,371

(22) Filed: Jul. 5, 2022

(65) Prior Publication Data
US 2022/0332048 A1 Oct. 20, 2022

Related U.S. Application Data (62) Division of application No. 16/278,926, filed on Feb. 19, 2019, now Pat. No. 11,426,938.
(Continued)

(51) Int. Cl.
*A61C 13/34* (2006.01)
*B29C 64/35* (2017.01)
(Continued)

(52) U.S. Cl.
CPC .............. *B29C 64/35* (2017.08); *A61C 13/34* (2013.01); *B29C 64/135* (2017.08);
(Continued)

(58) Field of Classification Search
CPC ..... B29C 64/35; B29C 64/393; B29C 64/135; B33Y 10/00; B33Y 40/00; B33Y 80/00;
(Continued)

(56) References Cited

U.S. PATENT DOCUMENTS

| 4,020,208 A | 4/1977 | Mercer et al. |
| 4,840,565 A * | 6/1989 | Poveromo ............... A61C 9/002 433/74 |

(Continued)

FOREIGN PATENT DOCUMENTS

| IT | 274727 | 11/2012 | | |
| KR | 1507570 B1 * | 3/2015 | ............. | A61C 9/002 |

(Continued)

OTHER PUBLICATIONS

Dendukuri, Dhananjay, et al., "Continuous-flow lithography for high-throughput microparticle synthesis", Nature Materials, 5, 2006, 365-369.

(Continued)

*Primary Examiner* — Nicholas D Lucchesi
(74) *Attorney, Agent, or Firm* — Myers Bigel, P.A.

(57) ABSTRACT

A dental model, includes (a) an upper segment, the upper segment having a shape corresponding to at least a portion of a dental arch of a human patient; (b) a base segment having an external surface and a bottom surface; (c) at least one internal cavity formed in the base segment, and optionally the upper segment, the at least one internal cavity extending through the bottom surface; and (d) at least one wash channel extending from the external surface of the base segment through the base segment and into the at least one internal cavity.

7 Claims, 5 Drawing Sheets

Related U.S. Application Data (60) Provisional application No. 62/633,176, filed on Feb. 21, 2018.

(51) Int. Cl.
| | |
|---|---|
| *B29C 64/393* | (2017.01) |
| *B29C 64/135* | (2017.01) |
| *B33Y 10/00* | (2015.01) |
| *B33Y 80/00* | (2015.01) |
| *B33Y 40/00* | (2020.01) |
| *A61C 5/77* | (2017.01) |
| *B29L 31/00* | (2006.01) |

(52) U.S. Cl.
CPC ............ *B29C 64/393* (2017.08); *B33Y 10/00* (2014.12); *B33Y 40/00* (2014.12); *B33Y 80/00* (2014.12); *A61C 5/77* (2017.02); *B29L 2031/753* (2013.01)

(58) Field of Classification Search
CPC ........... A61C 13/34; A61C 5/77; A61C 13/01; A61C 9/002
See application file for complete search history.

(56) References Cited

U.S. PATENT DOCUMENTS

| | | | |
|---|---|---|---|
| 4,842,515 A * | 6/1989 | Zeiser | A61C 9/002 433/34 |
| 4,898,359 A * | 2/1990 | Gopon | A61C 9/002 249/176 |
| 5,039,567 A | 8/1991 | Landi et al. | |
| 5,122,441 A | 6/1992 | Lawton et al. | |
| 5,236,637 A | 8/1993 | Hull | |
| 5,286,191 A * | 2/1994 | Poveromo | A61C 9/002 433/74 |
| 5,391,072 A | 2/1995 | Lawton et al. | |
| 5,879,780 A | 3/1999 | Kindinger et al. | |
| 7,210,931 B1 * | 5/2007 | Huffman | A61C 9/002 433/57 |
| 7,328,077 B2 | 2/2008 | Durbin et al. | |
| 7,424,967 B2 | 9/2008 | Ervin et al. | |
| 7,438,846 B2 | 10/2008 | John | |
| 7,481,647 B2 | 1/2009 | Sambu et al. | |
| 7,678,440 B1 | 3/2010 | McKnight et al. | |
| 7,709,544 B2 | 5/2010 | Doyle et al. | |
| 7,845,930 B2 | 12/2010 | Shkolnik et al. | |
| 7,892,474 B2 | 2/2011 | Shkolnik et al. | |
| 8,110,135 B2 | 2/2012 | El-Siblani | |
| 8,738,340 B2 | 5/2014 | Dunne et al. | |
| 9,116,428 B1 | 8/2015 | Jacobsen et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,375,298 B2 | 6/2016 | Boronkay et al. | |
| 9,498,920 B2 | 11/2016 | Desimone et al. | |
| 9,921,037 B2 | 3/2018 | Wadley et al. | |
| 9,993,974 B2 | 6/2018 | Desimone et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,384,394 B2 | 8/2019 | McCluskey | |
| 10,596,755 B2 | 3/2020 | Desimone et al. | |
| 10,618,215 B2 | 4/2020 | Desimone et al. | |
| 2006/0080835 A1 | 4/2006 | Kooistra et al. | |
| 2011/0089610 A1 | 4/2011 | El-Siblani et al. | |
| 2011/0283873 A1 | 11/2011 | Wadley et al. | |
| 2013/0052396 A1 | 3/2013 | Dean et al. | |
| 2013/0143060 A1 | 6/2013 | Jacobsen et al. | |
| 2013/0292862 A1 | 11/2013 | Joyce | |
| 2013/0295212 A1 | 11/2013 | Chen et al. | |
| 2014/0041659 A1 | 2/2014 | Akouka et al. | |
| 2015/0277146 A1 | 10/2015 | Crespo et al. | |
| 2015/0331402 A1 | 11/2015 | Lin et al. | |
| 2015/0360419 A1 | 12/2015 | Willis et al. | |
| 2016/0361889 A1 | 12/2016 | Bartolome | |
| 2017/0129167 A1 | 5/2017 | Castanon | |
| 2017/0129169 A1 | 5/2017 | Batchelder et al. | |
| 2017/0217088 A1 | 8/2017 | Boyd et al. | |
| 2017/0360534 A1 | 12/2017 | Sun et al. | |
| 2018/0095448 A1 | 4/2018 | Vernon | |
| 2018/0264718 A1 | 9/2018 | McCluskey | |
| 2018/0264719 A1 | 9/2018 | Rolland et al. | |
| 2018/0304541 A1 | 10/2018 | Barth | |
| 2019/0039213 A1 | 2/2019 | Merlo et al. | |
| 2019/0126547 A1 | 5/2019 | Desimone et al. | |
| 2019/0263070 A1 | 8/2019 | Barth | |
| 2019/0291347 A1 | 9/2019 | Price et al. | |
| 2019/0389127 A1 | 12/2019 | Desimone et al. | |
| 2020/0139617 A1 | 5/2020 | Desimone et al. | |
| 2020/0246119 A1 | 8/2020 | Long et al. | |
| 2020/0324479 A1 | 10/2020 | Friedrich et al. | |
| 2020/0362157 A1 | 11/2020 | Parkar et al. | |
| 2021/0163664 A1 | 6/2021 | Klun et al. | |
| 2021/0206096 A1 | 7/2021 | Mansouri et al. | |
| 2021/0299950 A1 | 9/2021 | Wolter et al. | |
| 2021/0370393 A1 | 12/2021 | Lee et al. | |

FOREIGN PATENT DOCUMENTS

| | | | |
|---|---|---|---|
| WO | WO-9311718 A1 * | 6/1993 | ............ A61C 9/002 |
| WO | WO-0101881 A2 * | 1/2001 | ............ A61C 11/08 |
| WO | 0172501 A1 | 10/2001 | |
| WO | 2011086450 A2 | 7/2011 | |
| WO | 2018182974 A1 | 10/2018 | |

OTHER PUBLICATIONS

Dendukuri, Dhananjay, et al., "Modeling of Oxygen-Inhibited Free Radical Photopolymerization in a PDMS Microfluidic Device", Macromolecules, 41, 2008, 8547-8556.

Dendukuri, Dhananjay, et al., "Stop-flow lithography in a microfluidic device", The Royal Society of Chemistry, Lab on a Chip, 7, 2007, 818-828.

Morelli, Dean, "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, 37 pp.

Pan, Yayue, et al., "A Fast Mask Projection Stereolithography Process for Fabricating Digital Models in Minutes", J. Manufacturing Sci. and Eng. 134(5), 2012, 051011-1-9.

Stern, S. A., "The "Barrer" Permeability Unit", Journal of Polymer Science: Part A-2, 6(11), 1968, 1933-1934.

Tumbleston, John R., et al., "Continuous liquid interface production of 3D Objects", Science, 347(6228), 2015, 1349-1352.

Yasuda, H., et al., "Permeability of Polymer Membranes to Dissolved Oxygen", Journal of Polymer Science, 4, 1966, 1314-1316.

\* cited by examiner

FIGURE 7

RAPID WASH SYSTEM FOR ADDITIVE MANUFACTURING

RELATED APPLICATIONS

This application is a divisional of U.S. application Ser. No. 16/278,926, filed Feb. 19, 2019, which application claims priority to U.S. Provisional Application Ser. No. 62/633,176, filed Feb. 21, 2018, the disclosures of which is hereby incorporated by reference in their entirety.

FIELD OF THE INVENTION

The present invention concerns additive manufacturing, and particularly concerns systems for additive manufacturing in which residual resin is more rapidly washed from additively manufactured objects.

BACKGROUND

Dental models and dies are used to prepare prosthetic crowns for patients, typically in labs where the crowns are manufactured, and then tested and modified by dental artisans as required, before they are sent to the dentist for fitting onto a previously prepared tooth of a patient (See, e.g., U.S. Pat. No. 7,328,077 to Durbin et al.). Because humans are so sensitive to even slight mis-alignments between their teeth, a high level of accuracy for such models is required (See, e.g., U.S. Pat. No. 8,738,340 to Dunne et al.).

Currently, the most accurate dental models and dies are milled from larger blocks of materials on five-axis milling machines. While accurate, such machines are expensive, and can be slow. And, speed of manufacture is important, because temporary crowns can be fragile, and a patient's teeth can shift surprisingly quickly if the permanent crown is not promptly installed (potentially requiring the manufacture of an entirely new crown).

Additive manufacturing techniques would seem ideally suited to the production of dental models and dies. Unfortunately, the more accurate techniques, such as jet-printing methods, can be extremely slow (for example, requiring approximately five hours to produce the model), and can generate objects with poor material and handling properties. The more rapid techniques (such as stereolithography), on the other hand, can sometimes produce models and dies with less accuracy than desired (see, e.g., U.S. Pat. No. 9,375,298 to Boronkay et al.; U.S. Pat. No. 7,481,647 to Sambu et al.). Further, such techniques are generally carried out by photopolymerizing a viscous resin, with few techniques available for rapidly washing the viscous resin from the objects once they are produced.

SUMMARY

A first aspect of the present invention is a method of making at least one object by additive manufacturing, comprising:
  (a) providing an additive manufacturing apparatus, the apparatus including a light source;
  (b) providing a carrier platform (e.g., a platform having a smooth, flat, continuous and unperforated, surface);
  (c) providing an initial object image sequence for the at least one object to be manufactured on the carrier platform, wherein the initial object image sequence comprises at least one internal cavity;
  (d) providing wash channel data;
  (e) combining the initial object image sequence with the wash channel data to create a modified object image sequence comprising the at least one object and at least one wash channel penetrating therethrough and into the at least one internal cavity;
  (f) producing the at least one object on the carrier platform with the additive manufacturing apparatus from a light polymerizable resin using the modified object image sequence;
  (g) washing the at least one object on the carrier platform with a wash liquid under conditions in which the wash liquid reaches the at least one internal cavity through the at least one wash channel;
  (h) optionally, further curing (e.g., by heating) the at least one object (while still connected to, or separated from, the carrier platform); and In some embodiments, the method further comprises (i) optionally, but in some embodiments preferably, repeating steps (b) through (h) on the same additive manufacturing apparatus with: (i) a different initial object image sequence, (ii) either a different carrier platform or the same carrier platform, and (iii) the same wash channel data.

In some embodiments, the additive manufacturing apparatus includes a controller, and the combining step is carried out on the controller.

In some embodiments, the additive manufacturing apparatus comprises a bottom-up stereolithography apparatus.

In some embodiments, the at least one wash channel comprises a plurality of wash channels.

In some embodiments, the combining step further comprises: detecting at least one continuous solid region in the at least one object that is free of internal cavities; and interrupting the at least one wash channel so that it does not penetrate through the at least one solid region.

In some embodiments, the at least one object comprises a plurality (or "set") of objects.

In some embodiments, the at least one object has an outer surface and a bottom surface, with the bottom surface adhered to the carrier platform during the washing step, with the at least one internal cavity open to the bottom surface, and with either: (i) the at least one wash channel open to the bottom surface (e.g., continuously open through the length of the at least one wash channel) and configured to provide fluid communication between the at least one internal cavity and the outer surface during the washing step; or (ii) the at least one wash channel spaced away from the bottom surface and configured to provide fluid communication between the at least one internal cavity and the outer surface during the washing step.

In some embodiments, the at least one object comprises a dental model having an upper segment and a base segment, with the upper segment having a shape corresponding to at least a portion of a dental arch of a human patient, and with the at least one wash channel formed in the base segment.

A further aspect of the invention is a dental model, comprising:
  (a) an upper segment, the upper segment having a shape corresponding to at least a portion of a dental arch of a human patient;
  (b) a base segment having an external surface and a bottom surface (e.g. a substantially flat planar bottom surface);
  (c) at least one internal cavity formed in the base segment, and optionally the upper segment, the at least one internal cavity extending through the bottom surface; and (d) at least one (or a plurality of) wash channel(s) extending from the external surface of the base segment through the base segment and into the at least one internal cavity.

In some embodiments, the at least one wash channel comprises a plurality of wash channels.

In some embodiments, (i) the at least one wash channel is open to the bottom surface (e.g., continuously open through the length of the at least one wash channel); or (ii) the at least one wash channel is spaced away from the bottom surface.

In some embodiments, the bottom surface is substantially flat and planar.

In some embodiments, during its production by additive manufacturing, and during washing, the dental model may further comprise an additive manufacturing apparatus carrier platform (e.g., a platform having a smooth, flat, continuous and unperforated, surface) to which the bottom surface of the dental model is adhered (e.g., directly adhered, or through an adhesively attached release sheet), though the dental model will ultimately be removed from the platform.

While the present invention is primarily illustrated with application to dental models, it will be appreciated that it can be applied to any of a variety of useful objects that are produced by additive manufacturing.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Like numbers are assigned to analogous elements in the Figures herein and discussed below, generally differentiated by an alphabetic suffix or an apostrophe.

1. Additive Manufacturing Methods and Apparatus.

Additive manufacturing of objects is preferably carried out with polymerizable resins by additive manufacturing, particularly stereolithography, and preferably bottom-up stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Pat. No. 9,636,873 to Joyce, and U.S. Pat. No. 9,120,270 to Chen et al. Such techniques typically involve projecting light through a window above which a pool of resin (or polymerizable liquid) is carried. A general purpose or functional part carrier is typically positioned above the window and above the pool, on which the growing object is produced.

In some embodiments of the present invention, the object is formed by continuous liquid interface production (CLIP). CLIP is known and described in, for example, PCT Applications Nos. PCT/US2014/015486 (also published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out continuous liquid interface production (CLIP) include, but are not limited to: Batchelder et al., Continuous liquid interface production system with viscosity pump, US Patent Application Publication No. US 2017/0129169 (May 11, 2017); Sun and Lichkus, Three-dimensional fabricating system for rapidly producing objects, US Patent Application Publication No. US 2016/0288376 (Oct. 6, 2016); Willis et al., 3d print adhesion reduction during cure process, US Patent Application Publication No. US 2015/0360419 (Dec. 17, 2015); and Lin et al., Intelligent 3d printing through optimization of 3d print parameters, US Patent Application Publication No. US 2015/0331402 (Nov. 19, 2015).

In general, bottom-up three-dimensional fabrication is carried out by:
(a) providing a carrier and an optically transparent member having a build surface, the carrier and the build surface defining a build region therebetween;
(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then
(c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In some embodiments, the additive manufacturing apparatus can be a Carbon, Inc. M1 or M2 apparatus implementing continuous liquid interface production, available from Carbon, Inc., 1089 Mills Way, Redwood City, California 94063 USA.

2. Resins.

Resins, or photopolymerizable liquids, used in carrying out the methods of the invention, can be conventional resins, or dual cure resins (that is, resins requiring further cure following additive manufacturing, such as a baking step). Numerous suitable resins are known and include, but are not limited to those described in the references above. In some embodiments, dual cure resins such as those described in U.S. Pat. Nos. 9,453,142 and/or 9,598,606 to Rolland et al., can be used.

In some embodiments, the resin is one which, when polymerized to produce the model and die, produces a model and die comprised of poly(acrylate), poly(methacrylate), poly(urethane acrylate), poly(urethane methacrylate), poly(epoxy acrylate), or poly(epoxy methacrylate).

In some embodiments, the resin is one which, when polymerized to produce the model and die, produces a model and die comprising or consisting of a polymer having: a tensile modulus of 1200 or 1600 MPa to 3000 MPa, or more; an elongation at break of 2% to 100 or 140%, or more; a flexural strength of 40 or 60 MPa, to 100 or 120 MPa, or more; and/or a flexural modulus (chord, 0.5%-1% strain) of 1500 or 2000 MPa, to 3000 MPa, or more.

Particular examples of suitable resins include, but are not limited to, Carbon, Inc., UMA resins (particularly PR25 resin in the UMA resin family), as well as Carbon, Inc. RPU and EPX dual cure resins, available from Carbon, Inc., 1089 Mills Way, Redwood City, California 94063 USA.

3. Post-Production Steps.

As noted above, aspects of the invention involve washing the object, and then (depending on the choice of resin) further curing the object.

Washing. After the intermediate object is formed, it is optionally washed (e.g., with an organic solvent), optionally dried (e.g., air dried) and/or rinsed (in any sequence).

Solvents (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g., 3,3-Dichloro-1,1,1,2,2-pentafluoropropane, 1,3-Dichloro-1,1,2,2,3-pentafluoropropane, 1,1-Dichloro-1-fluoroethane, etc.); hydrofluorether solvents (e.g., methyl nonafluorobutyl ether (HFE-7100), methyl nonafluoroisobutyl ether (HFE-7100), ethyl nonafluorobutyl ether (HFE-7200), ethyl nonafluoroisobutyl ether (FIFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30 Dow Corning), etc.), including mixtures thereof.

Any suitable cleaning apparatus may be used, including but not limited to those described in U.S. Pat. No. 5,248,456 to Evans, Jr. et al.; U.S. Pat. No. 5,482,659 to Sauerhoefer; U.S. Pat. No. 6,660,208 to Hanna; U.S. Pat. No. 6,996,245 to Hanna; and U.S. Pat. No. 8,529,703 to Kabashima et al.

A preferred wash apparatus is a Carbon, Inc. smart part washer, available from Carbon, Inc., 1089 Mills Way, Redwood City, California 94063 USA. Thus, in some embodiments, the wash step, when included, may be carried out by immersing the object in a wash liquid such as described above, with agitation (e.g., by rotating the composite article in the wash liquid), optionally but preferably with the wash step carried out in a total time of 10 minutes or less.

Further curing. Further (or second) curing may be carried out by any suitable technique, including but not limited to those described in U.S. Pat. No. 9,453,142 to Rolland et al. In a preferred embodiment, the further curing is carried out by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the object at ambient temperature for a sufficient time to effect further cure—is in some embodiments preferred. Ovens may be batch or continuous (conveyor) ovens, as are known in the art.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. No. 4,951,648 to Shukla et al.; U.S. Pat. No. 5,179,265 to Sheridan et al.; U.S. Pat. No. 5,197,375 to Rosenbrock et al.; and U.S. Pat. No. 6,799,712 to Austen et al.

In some embodiments, the heating step is carried out using at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out using at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075 to Shimp.)

4. Rapid Wash System.

In the present invention, the components described above are further combined with the features described herein to provide a system in which objects such as dental models are more rapidly washed following additive manufacturing.

Figure 1A:
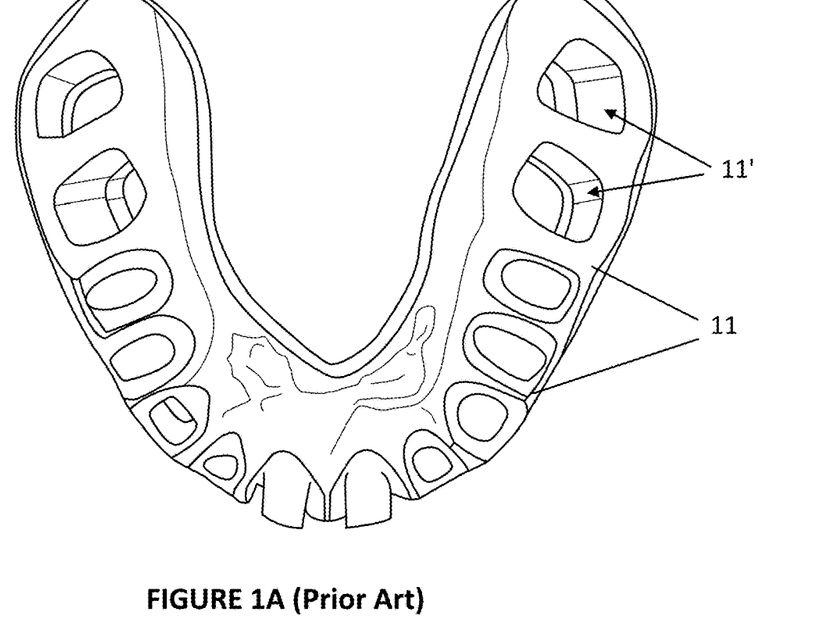
FIG. 1A is a top view of a dental model, substantially as known in the prior art.
Figure 1B:
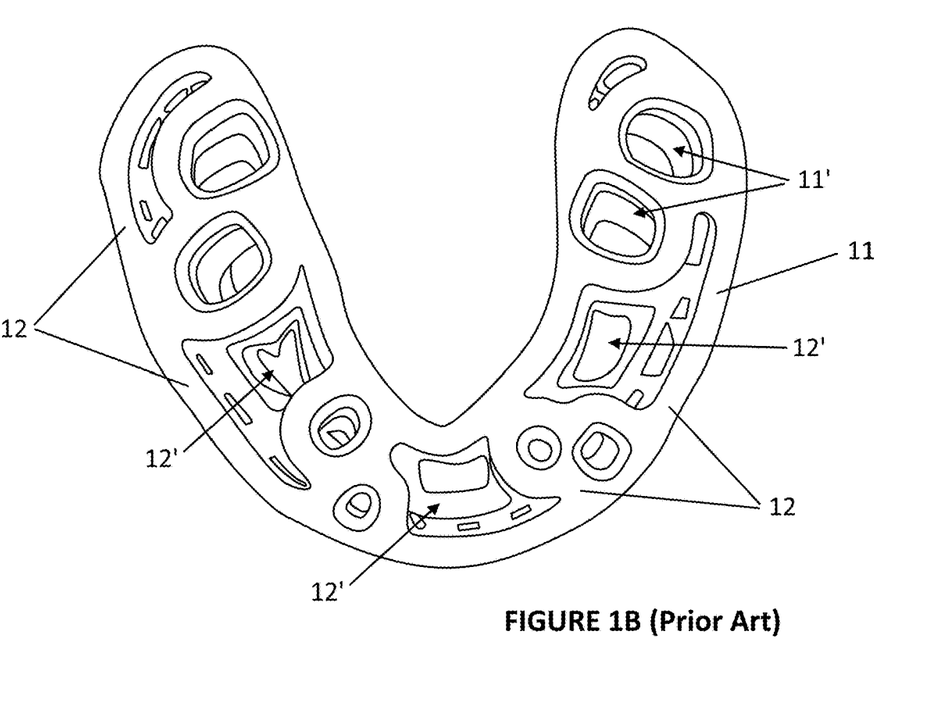
FIG. 1B is a bottom view of the dental model of FIG. 1A.

FIGS. 1A-1B show an example dental model 11 of the prior art. The dental model 11 includes (in this particular non-limiting illustration) transverse through-holes 11' in which dental dies may be inserted. As visible in FIG. 1B, the model has a bottom surface 12, through which at least one, and typically a plurality, of internal cavities 12' project.

A problem with additively manufacturing the dental model 11 of FIGS. 1A-1B is that, when the bottom surface 12 is adhered to the (generally solid, flat, planar) carrier platform of an additive manufacturing apparatus, and when attempting to wash residual resin from the object following additive manufacturing with the object still on the carrier platform, wash liquid cannot reach the internal cavities 12' sufficiently to remove excess resin therefrom.

In practice, two or more dental models may be produced concurrently on a carrier platform, optionally along with any associated dental dies. An example of a first, or early, image as may be projected during stereolithographic production of such a set of models is given as an initial image 101' in FIG. 2.

Figure 4:
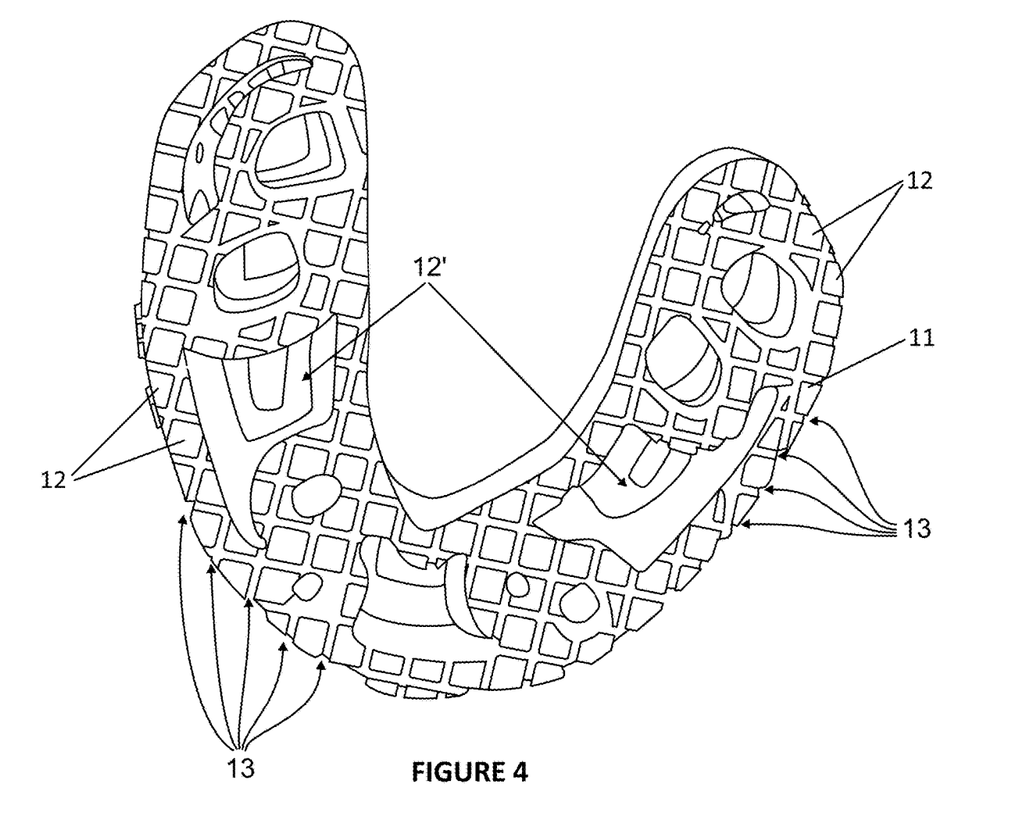
FIG. 4 is a bottom view of a dental model of the present invention, as may be produced by projection of an image as shown in FIG. 3.

In a first example embodiment of a dental model of the present invention, shown in FIG. 4, at least one, or more preferably a plurality, of transverse wash channels 13 are formed in the base of the dental model 11, which wash channels 13, even when the dental model 11 is adhered to a carrier platform, allow fluid communication between the interior and exterior of the dental model 11, and allow wash liquid to reach the internal cavities 12' that would otherwise be trapped by the carrier platform and remove excess or residual resin contained therein. In other words, the dental model 11 and the carrier platform may form an internal cavity 12' that is fully enclosed on all sides. Though the discussion herein describes forming wash channels 13 to provide access to internal cavities 12' that may become trapped when placed on the carrier platform, it will be understood that the internal cavities 12' described herein may also be internal cavities 12' to which access by wash liquid is restricted, but not fully blocked. That is to say that the methods described herein may provide wash channels 13 that facilitate increased flow of wash liquid to internal cavities 12'.

Figure 5A:
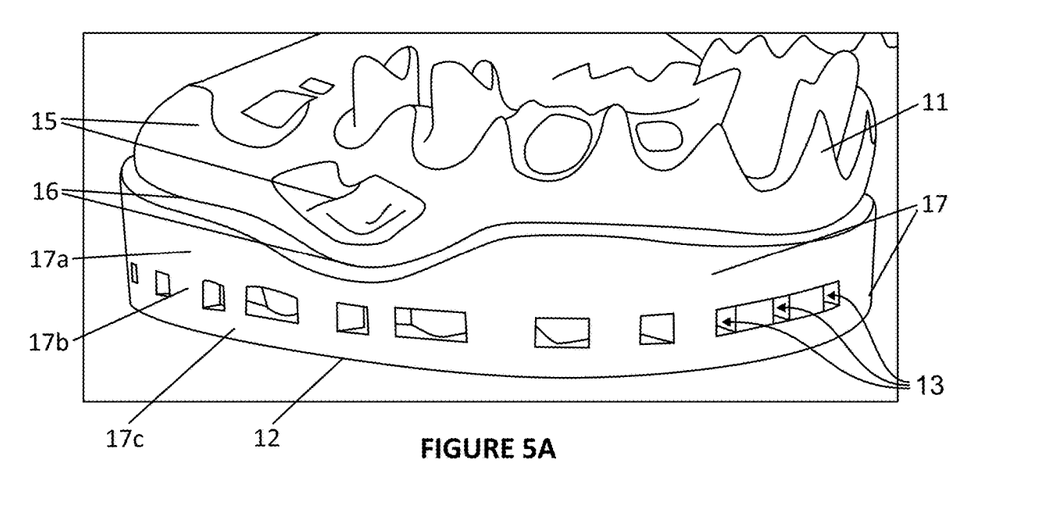
FIG. 5A is a front side view of an alternate embodiment of a dental model of the present invention, as may be produced by projection of an image as shown in FIG. 3 during an early (but not earliest) phase of bottom-up stereolithographic production thereof.
Figure 5B:
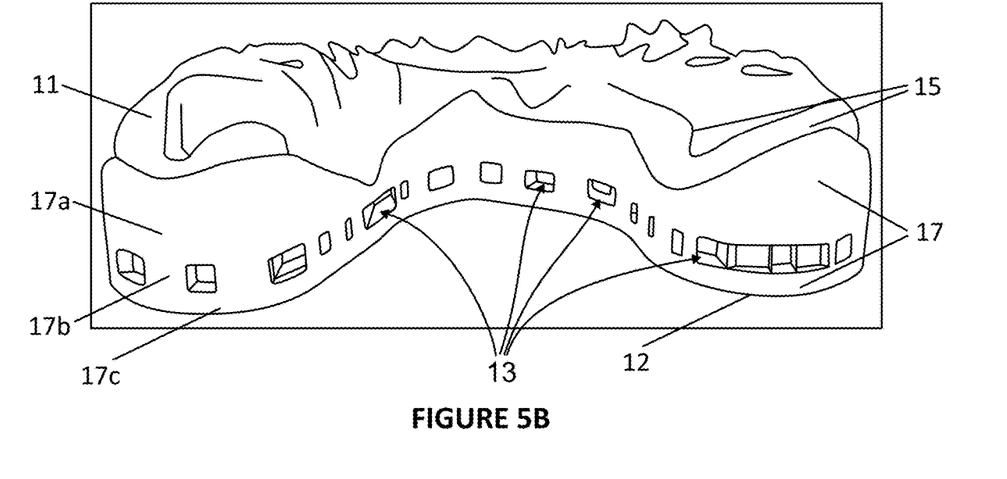
FIG. 5B is a back side view of the dental model of FIG. 5A.

In the embodiment of FIGS. 5A-5B, the wash channels 13 are spaced away from the bottom surface (not seen) of the dental model 11, to provide a smoother, less interrupted, bottom surface, as may facilitate the comfortable handling thereof. In the embodiment of FIGS. 5A-5B, it is seen that the dental model 11 has an upper portion 15 in the shape of at least a portion of the dental arch of a human patient, a base portion 17, and a transition portion or boundary 16 therebetween. The base portion is in turn divided into an upper portion 17a, an intermediate portion 17b, and a bottom portion 17c on which bottom portion the bottom surface 12 is formed. The bottom surface 12 of the embodiment of FIGS. 5A-5B may have substantially the same appearance as the bottom surface of the prior art embodiment shown in FIG. 1A, except that embodiment of FIGS. 5A-5B has wash channels 13 formed in the intermediate portion 17b, which wash channels 13, if exposed in a sectional view (e.g., through intermediate portion 17b), would have an appearance substantially the same as shown in the embodiment of FIG. 4.

Figure 2:
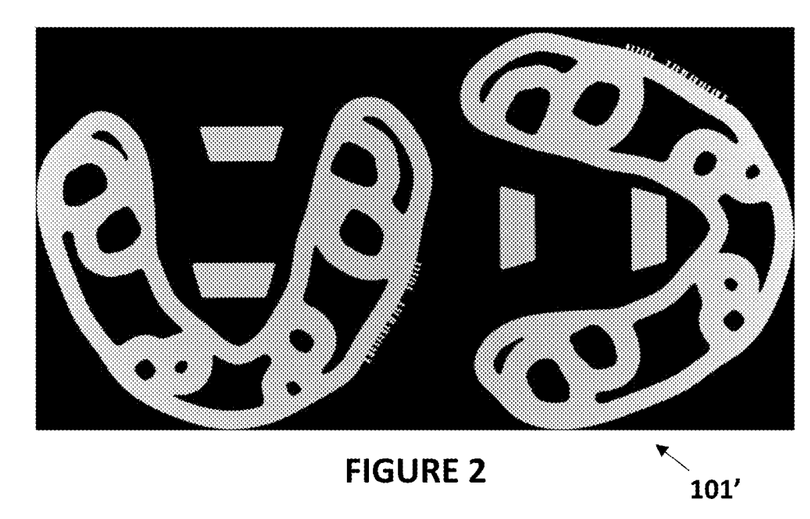
FIG. 2 is an image as may be projected into a polymerizable liquid during an early phase of bottom-up stereolithographic production, for a pair of dental models similar to those of FIGS. 1A and 1B, with each dental model of the pair having a further pair of dental dies (represented by trapezoidal shapes) associated therewith.
Figure 3:
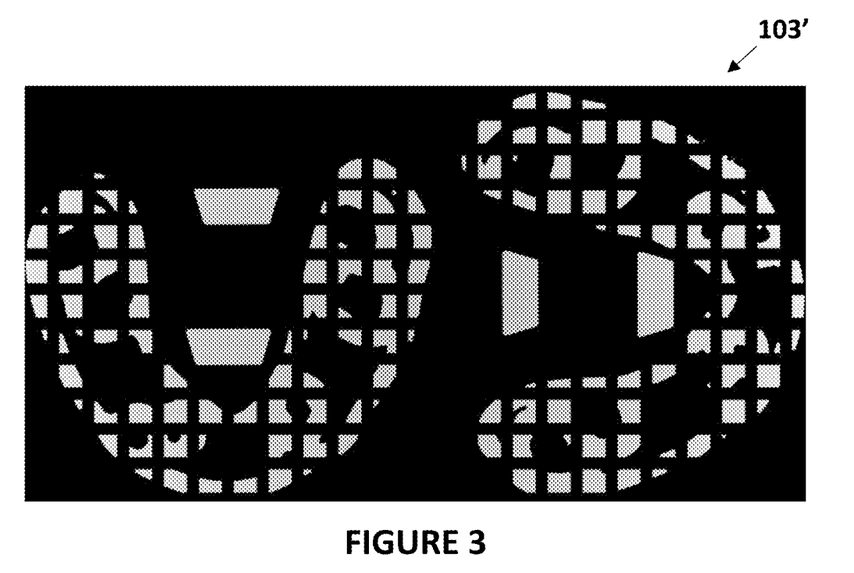
FIG. 3 is an image as may be projected into a polymerizable liquid during an early phase of bottom up stereolithography, for a pair of dental models of the present invention. Note that the masked channels (represented by dark lines) do not extend through the otherwise-solid dental dies.

FIG. 3 is similar to FIG. 2 as discussed above, except that it shows a merged image 103' as may be projected during stereolithographic production of a model of FIG. 4, or FIG. 5A-5B. In some embodiments, the merged image 103' may be formed by adding representations of the wash channels 13 into the initial image 101' of FIG. 2 to form the merged image 103'. In some embodiments, the merged image 103' may be a modified image 103' based on the initial image 101'.

As best seen in FIGS. 3-4, but as is the case with both the embodiment of FIG. 4 and the embodiment of FIG. 5A-5B, in both embodiments the wash channels 13 are in the form of intersecting sets of wash channels 13, which may enhance the flow of wash liquid into the internal cavities 12'. Also, while the wash channels 13 are shown as straight, they may be angled, curved, or a composite thereof, and indeed may be formed in any suitable pattern.

Figure 6:
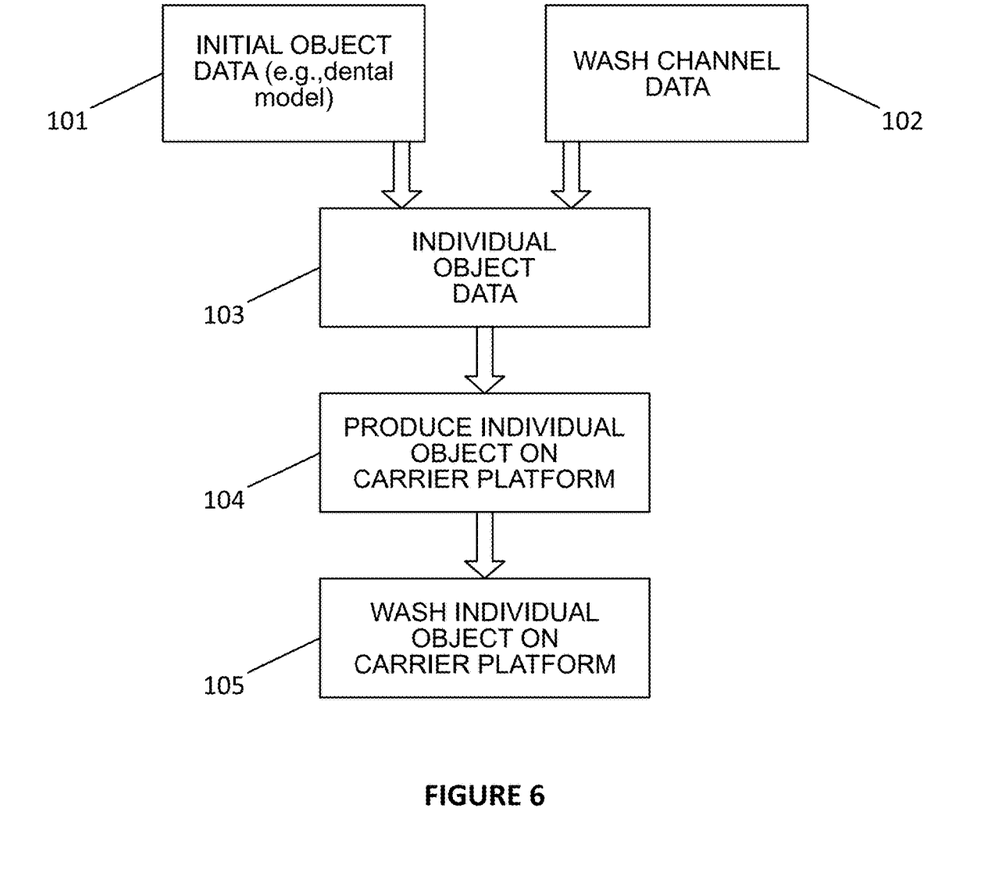
FIG. 6 is a flow chart of a portion of a process of the present invention, showing merging of a mask channel image with a dental model image.
Figure 7:
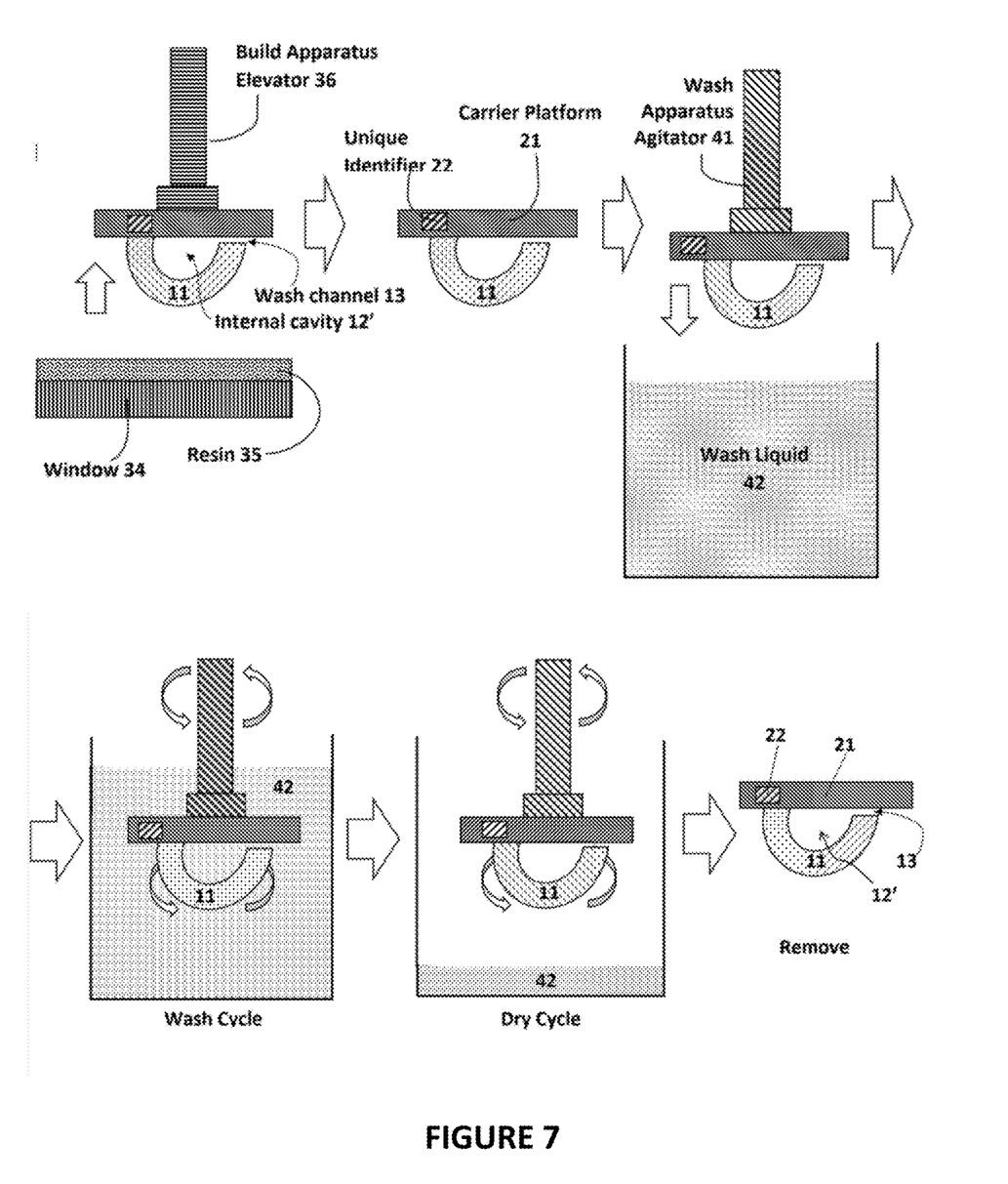
FIG. 7 is a schematic diagram of a process of the present invention.

FIGS. 6-7 schematically illustrate a system and process of the present invention. As shown in FIG. 6, initial object data 101 (an example of a portion of which is given in FIG. 2) and wash channel data 102 are combined, in a controller or processor of an additive manufacturing apparatus, to form merged data 103 (an example of a portion of which is given in FIG. 3). The merged data 103 is then used to produce an object on an additive manufacturing apparatus 104 (as described in sections 1-2 above), which is then washed 105 and optionally further cured (as described in section 3 above).

In general, in some embodiments, the initial object data 101 is separated into a series of slices, which may be black and white pictures representing the geometry of the object(s) to be produced at different planes in the vertical (z) axis of the additive manufacturing apparatus, where white represents a region where resin material is to be photopolymerized, and black represents regions where resin is to remain in liquid form. Unvented internal cavities 12' can be identified by examining the slices for black regions that are completely enclosed by white regions (e.g., along a series of sequential slices of the object). This operation may also identify solid regions (e.g., the trapezoidal regions in FIGS. 2-3) that do not require addition of wash channels 13.

Once regions requiring venting by wash channels 13 are identified, wash channels 13 can be added by importing wash channel data 102. In some embodiments, the wash channel data 102 may be provided in the form of a predetermined mask of black channels. In some embodiments, the wash channel data 102 may include locations for the wash channels 13 that are algorithmically generated. For example, respective ones of the sequential slices of the object may be analyzed to determine a shortest path through white regions that completely enclose a black region. In some embodiments, the analysis may incorporate connections between wash channels 13 to facilitate movement of wash liquid through the object. The wash channel data 102 may be applied to the slices of the initial object data 101 in the appropriate location along the z axis of the object. Thus, the wash channel data 102 may be combined with the initial object data 101 to produce individual object data 103 that defines the object that includes wash channels 13. When the slices that are modified to incorporate the wash channels 13 are projected during the additive manufacturing process, the regions for the wash channels 13 are masked off. Done over a series of pictures in sequence, this creates wash channels 13 (e.g., vent holes) in the final additively-manufactured object.

As noted above, the initial object data 101 may include solid regions (e.g., the trapezoidal regions in FIGS. 2-3) that do not require the addition of wash channels 13. Such regions may not contain internal cavities 12' and may, therefore, not need wash channels 13 defined through them. In some embodiments, combining the initial object data 101 with the wash channel data 102 may include interrupting portions of the wash channels 13 of the wash channel data 102 so as not to penetrate through the identified solid regions.

In some embodiments, combining the initial object data 101 with the wash channel data 102 may include extending portions of the initial object data 101. In such embodiments, adding the wash channels 13 may involve more than adding a channel mask over the initial object data 101. For example, referring to FIGS. 5A, 5B and 6, in some embodiments the intermediate portion 17b and bottom portion 17c of the base portion 17 of the object 11 may not be present in the initial object data 101, and the intermediate portion 17b and bottom portion 17c of the base portion 17 may be added to the individual object data 103 as part of adding the wash channels 13. Stated another way, combining the initial object data 101 with the wash channel data 102 may include both adding wash channels 13 within the existing structure of the initial object data 101 as well as adding additional structure to the initial object data 101 to support the wash channels 13. In some embodiments, the additional structure and/or the wash channels 13 may be sacrificial and may be removed in a subsequent manufacturing step.

As shown in FIG. 7, in some embodiments the object 11 is produced on a bottom-up stereolithography apparatus in which a resin 35 (such as described in section 2 above) is carried by a window, through which an image (such as shown in FIGS. 2-3 above) is projected. The object 11 is produced on a carrier platform 21, which is in turn advanced away from the window by the build apparatus elevator 36. As illustrated in FIG. 7, the object 11 may be additively manufactured to include wash channels 13 penetrating through the object 11 to an internal cavity 12'. Optionally, the carrier platform may include a unique identifier 22, with the production apparatus and wash apparatus optionally including an identifier reader (not shown) to record the identity of the particular object 11 being produced and washed.

After production, the object 11 is transferred, while still on the carrier platform 21, to a wash apparatus agitator 41, by which it is immersed in a wash liquid 42 and agitated, such as by shaking or spinning (although the converse can also be done, or keeping the object 11 static and agitating the wash liquid 42). Note the wash liquid 42 may penetrate into the internal cavity 12' through the wash channel 13 during the wash cycle. The level of wash liquid 42 in the wash vessel can then be lowered and the object 11, still on the carrier platform 21, further agitated to shake or spin off excess wash liquid 42 and resin 35, in a dry cycle (and note the wash liquid 42 also drains, at least in part, from the internal cavity 12' through the wash channel 13 during the dry cycle). The wash and dry cycle may optionally be repeated one or more times, after which the object 11 can be removed from the carrier platform 21 for final processing, and/or for further curing (e.g., by heating or baking) as discussed above.

The foregoing is illustrative of the present invention, and is not to be construed as limiting thereof. The invention is defined by the following claims, with equivalents of the claims to be included therein.

We claim:
1. A dental model, comprising
   (a) an upper segment, said upper segment having a shape corresponding to at least a portion of a dental arch of a human patient;
   (b) a base segment having an external surface and a bottom surface;
   (c) at least one internal cavity formed in said base segment, said at least one internal cavity extending through said bottom surface; and
   (d) at least one wash channel extending from said external surface of said base segment through said base segment and into said at least one internal cavity,
   wherein said at least one wash channel is spaced away from said bottom surface.
2. The dental model of claim 1, wherein said at least one wash channel comprises a plurality of wash channels.
3. The dental model of claim 1, wherein said bottom surface is substantially flat and planar.
4. The dental model of claim 1, further comprising:
   (e) an additive manufacturing apparatus carrier platform to which said bottom surface of said dental model is adhered.
5. A dental model, comprising
   (a) an upper segment, said upper segment having a shape corresponding to at least a portion of a dental arch of a human patient;
   (b) a base segment having an external surface and a bottom surface;

(c) at least one internal cavity formed in said base segment, said at least one internal cavity extending through said bottom surface; and (d) at least one wash channel extending from said external surface of said base segment through said base segment and into said at least one internal cavity, wherein said at least one wash channel comprises a plurality of intersecting wash channels.

6. The dental model of claim 5, wherein said plurality of wash channels are defined in said bottom surface.

7. The dental model of claim 5, wherein said plurality of wash channels are spaced apart from said bottom surface and extend through an intermediate portion of said base segment.

\* \* \* \* \*

UNITED STATES PATENT AND TRADEMARK OFFICE
CERTIFICATE OF CORRECTION

PATENT NO. : 11,897,200 B2
APPLICATION NO. : 17/857371
DATED : February 13, 2024
INVENTOR(S) : Graham et al.

It is certified that error appears in the above-identified patent and that said Letters Patent is hereby corrected as shown below:

In the Specification

Column 6, Line 38: Please correct "FIFE-7200" to read --HFE-7200--

Signed and Sealed this
Thirtieth Day of April, 2024

Katherine Kelly Vidal
*Director of the United States Patent and Trademark Office*